Patented Oct. 30, 1951

2,573,337

UNITED STATES PATENT OFFICE 2,573,337

COATED METAL MOLD FOR BLOWING GLASS AND METHOD OF PREPARING THE SAME

James Franklin Hyde, Corning, N. Y., assignor to Corning Glass Works, Corning, N. Y., a corporation of New York No Drawing. Application February 16, 1948, Serial No. 8,740

4 Claims. (Cl. 49—65)

This invention relates to glass shaping molds and particularly to metal molds employed for blowing glass bulbs. In the manufacture of symmetrically-shaped hollow glass articles such as electric lamp bulbs by blowing, it is customary to rotate either the glass or the mold so as to impart the smoothest possible surface to the glass. In order to reduce the friction between glass and mold to a minimum, it is also customary to coat the glass-contacting surfaces of the mold with a porous carbonaceous coating capable of absorbing a small amount of water. When the hot plastic glass is brought into contact with the wet surface, a cushion of steam is formed between the glass and the mold which greatly facilitates their relative movement.

Such mold coatings are not as durable as is to be desired and they require relatively frequent renewal which would be less objectionable if the formation of the desired coating were more simple. With automatic blowing machines capable of producing up to 1000 or more bulbs per minute, the short durability of the mold coatings is an important obstacle to continuous production.

The primary object of this invention is to provide metal blow molds with a suitable coating which is easier to apply and which is more durable than prior coatings.

Another object is to provide coated metal blow molds which are particularly suitable for use on high-speed automatic blowing machines.

For these purposes I have found that suitable coatings comprise certain polymeric organo silicon compounds either alone or in combination with a finely divided filler such as silica, carbon, or titanium dioxide. Broadly, the invention includes a metal mold having on its glass contacting surface an adherent coating comprising a copolymer of at least one silsesquioxane selected from the group consisting of monomethyl silsesquioxane and monophenyl silsesquioxane with a diorgano siloxane selected from the group consisting of dimethyl siloxane and methylphenyl siloxane, the diorgano siloxane units amounting to 5% to 90% of the total siloxane units.

The silsesquioxanes or monosubstituted organo siloxanes are repesented by the unit formula $RSiO_{3/2}\equiv$ and the diorgano siloxanes or disubstituted organo siloxanes are represented by the unit formula $R_2SiO=$, where R is an organic radical for example an aliphatic or an aromatic radical. The mono- and di-substituted organo siloxanes may be prepared by the hydrolysis of the corresponding mono- and di-substituted chlorosilanes, $RSiCl_3$ and $R_2SiCl_2$, respectively, as starting materials and the subsequent condensation or dehydration of the resulting hydrolysis products. The condensation or dehydration is carried to the point that the siloxane is soluble in such solvents as toluene. When the mono- and di-substituted starting materials are mixed and the mixture is hydrolyzed and condensed, copolymerization takes place. If the mono-substituted material consists of either or both the monomethyl- or monophenyl-trichlorosilane and the di-substituted material consists of either dimethyl- or methylphenyl-dichlorosilane in the proportions of 5 to 90 mol percent of the di-substituted material, and 95 to 10 mol percent of the mono-substituted material, the resulting copolymer is not brittle and is particularly resistant to decomposition at relatively high temperatures. I have found that such copolymers adhere well to iron, particularly if the metal is first cleaned and pickled with one of the well-known rust preventatives containing metallic phosphates. The copolymer is dissolved in toluene or other organic solvent and the solution is then applied to the cleaned and pickled metal surface after which the mold is baked to cure the resin by heating. Curing may be effected, for example, by heating at a temperature of about 200° to 300° C. until the coating becomes set and is not tacky.

In use, the coating becomes covered with a thin porous siliceous residue which is quite resistant to wear and absorbs sufficient water to provide the necessary steam cushion for the glass article being formed. If desired, the surface porosity and thickness or body of the coating may be increased by introducing fillers therein. These are added to the solution before it is applied to the metal surface, and may comprise up to 50% or more by weight of the finished coating. Fillers which are suitable for this purpose comprise finely divided silica, for example, ground sand or silica aerogel, finely divided carbon such as graphite and finely powdered titanium dioxide. Curing catalysts, such as paint driers, for instance, organic salts of cobalt, or such as alkaline materials, for instance, the ethanol amines, may be included in the coating composition in order to reduce the time or temperature to obtain cure or both.

*Example 1*

30 mol percent of methyl trichlorosilane, 15 mol percent of phenyl trichlorosilane, and 55 mol percent of methylphenyl dichlorosilane were mixed and hydrolyzed by the addition of toluene and an excess of water over that needed for the hydrolysis. After the reaction was complete, residual water was removed by decantation and by distillation of the toluene. The resulting siloxane was held at 130° to 180° C. under vacuum until a 50% by weight solution in toluene had a viscosity of 30 to 40 centistokes. Toluene amounting to 10% was then added and heating was continued under atmospheric pressure until a 50% by weight solution in toluene had a viscosity of 125 centistokes. The partially polymerized product was then cooled and diluted with toluene to a 50% solution. To this solution, finely powdered $TiO_2$ amounting to about 40% by weight of the siloxane was added and thoroughly dispersed.

The solution thus prepared was painted on to a set of phosphated or rust-proofed iron molds for an automatic bulb-blowing machine and the coated molds were baked for two hours at about 205° C. At the end of this time the coating was dry and non-tacky. The molds were then placed in operation on the automatic blowing machine and continued for 45 hours, the machine operating at the rate of about 350 bulbs per minute. Satisfactory bulbs were made throughout the operation. When the molds were finally removed for examination the coating was in excellent condition.

*Example 2*

Equimolar proportions of monomethyl trichlorosilane, monophenyl trichlorosilane, and dimethyl dichlorosilane were hydrolyzed with water, after which the residual water was separated and the product was diluted with toluene to a 60% by weight solution. Rust-proofed iron molds were coated with the solution and were baked for two hours at about 300° C. The coated molds were then employed for blowing bulbs on an automatic bulb-blowing machine and were thus used for 68 hours, during which time a total of about one and three-quarter millions of bulbs were produced. At the end of this trial run the mold coatings still appeared to be satisfactory.

*Example 3*

To the 60% toluene solution of the polymer described in Example 2 was added about 25 grams of colloidal graphite per 100 cc. of solution. The mixture was applied to the surfaces of rust-proofed cast-iron blow molds which were then baked for two hours at about 250° C. The coated molds were then operated for 24 hours on an automatic bulb-blowing machine having all of its molds so coated. During the operation about 480,000 bulbs were made and the mold coatings after this time were still satisfactory.

*Example 4*

To the 60% toluene solution of the polymer described in Example 2 was added about 20 grams of finely ground sand per 100 cc. of solution. The mixture was applied to the surfaces of rust-proofed cast-iron blow molds which were baked for two hours at 300° C. Several applications of molten glass to the coated molds produced a smooth porous siliceous surface on the coating suitable for use in blowing glass bulbs.

I claim:

1. A metal mold for blowing glass having on its glass-contacting surface an adherent coating comprising a heat-cured siloxane composed of silsesquioxane units and diorgano siloxane units, the silsesquioxane units comprising at least one of the group consisting of $CH_3SiO_{3/2}\equiv$ and $C_6H_5SiO_{3/2}\equiv$ and the diorgano siloxane units being selected from the group consisting of $$(CH_3)_2SiO=$$

and $CH_3C_6H_5SiO=$, the diorgano siloxane units amounting to 5 to 90 mol per cent of the total siloxane, said coating having on its surface a porous, water absorbent, siliceous residue, said residue being that resulting from the contact of the heat-cured siloxane with molten glass.

2. A metal mold for blowing glass having on its glass-contacting surface an adherent coating comprising a heat-cured siloxane copolymer consisting of equimolar proportions of $CH_3SiO_{3/2}\equiv$ units, $C_6H_5SiO_{3/2}\equiv$ units and $(CH_3)_2SiO=$ units, said coating having on its surface a porous, water-absorbent, siliceous residue, said residue being that resulting from the contact of the heat-cured siloxane with molten glass.

3. A metal mold for blowing glass having on its glass-contacting surface an adherent coating comprising a heat-cured siloxane copolymer consisting of 30 mol per cent $CH_3SiO_{3/2}\equiv$ units, 15 mol per cent $C_6H_5SiO_{3/2}\equiv$ units and 55 mol per cent $CH_3C_6H_5SiO=$ units, said coating having on its surface a porous, water-absorbent, siliceous residue, said residue being that resulting from the contact of the heat-cured siloxane with molten glass.

4. In the method of preparing a metal mold for blowing glass, the steps which comprise applying to the glass-contacting surface of the mold a heat curable siloxane composed of silsesquioxane units and diorgano siloxane units, the silsesquioxane units comprising at least one of the group consisting of $CH_3SiO_{3/2}\equiv$ and $C_6H_5SiO_{3/2}\equiv$ and the diorgano siloxane units being selected from the group consisting of $(CH_3)_2SiO=$ and $CH_3C_6H_5SiO=$, heating the coated mold at 200° to 300° C. until the coating is non-tacky, and thereafter heating the coating by contacting it with molten glass whereby the outer portion of the coating becomes covered with a porous, water-absorbent, siliceous residue, said residue being that resulting from the contact of the heat-cured siloxane with the molten glass.

JAMES FRANKLIN HYDE.

REFERENCES CITED

The following references are of record in the file of this patent:

UNITED STATES PATENTS

| Number | Name | Date |
|---|---|---|
| 527,801 | Momper et al. | Oct. 23, 1894 |
| 2,258,218 | Rochow | Oct. 7, 1941 |
| 2,258,222 | Rochow | Oct. 7, 1941 |
| 2,442,212 | Rochow | May 25, 1948 |
| 2,447,611 | Collings et al. | Aug. 24, 1948 |
| 2,528,615 | Smith | Nov. 7, 1950 |

OTHER REFERENCES

"British Plastics" by Iliffe & Sons, Ltd. Dorset House, Stamford Street, London S. E. Oct. 1, 1946 (pp. 459–464).

"Rubber Age," Dow Corning Corp., Midland, Mich., Jan. 1947, p. 485.

Fortune, "The Silicones," May 1947—p. 228.